United States Patent [19]

Rainer

[11] Patent Number: 5,187,200

[45] Date of Patent: Feb. 16, 1993

[54] PROCESS FOR THE SELECTIVE ABSORPTION OF ANIONS

[76] Inventor: Norman B. Rainer, 2008 Fondulac Rd., Richmond, Va. 23229

[21] Appl. No.: 808,884

[22] Filed: Dec. 18, 1991

Related U.S. Application Data

[63] Continuation-in-part of Ser. No. 668,929, Mar. 13, 1991.

[51] Int. Cl.⁵ .......................... C08L 11/00; C08J 5/20; B01D 15/00; C08G 69/26
[52] U.S. Cl. .......................... 524/30; 521/25; 521/30; 210/688; 528/341; 528/342; 106/168; 525/417; 527/312; 536/57
[58] Field of Search ...................... 524/30; 521/25, 30; 528/341, 342; 525/417; 527/312; 536/57; 106/168; 210/688

[56] References Cited

U.S. PATENT DOCUMENTS

| | | | |
|---|---|---|---|
| 3,580,891 | 5/1971 | Rainer | 528/355 |
| 3,715,339 | 2/1973 | Rainer | 524/30 |
| 4,332,916 | 6/1982 | Thill | 521/25 |
| 5,002,984 | 3/1991 | Rainer | 524/30 |
| 5,096,946 | 3/1992 | Rainer | 524/30 |

*Primary Examiner*—John Kight, III
*Assistant Examiner*—P. Hampton-Hightower
*Attorney, Agent, or Firm*—Norman B. Rainer

[57] ABSTRACT

A process for selectively removing anions from an aqueous solution involves contacting the solution for an effective period of time with a specialized polymer in a porous format. The polymer has ligand sites capable of forming coordination or complexation bonds with multi-valent metal cations which serve to activate the polymer with respect to chemical interaction with anions. The polymer, saturated with the multivalent metal cations, contains between 2% and 20% of metal cation based upon the dry weight of the polymer.

10 Claims, No Drawings

PROCESS FOR THE SELECTIVE ABSORPTION OF ANIONS

RELATED APPLICATIONS

This application is a continuation-in-part of U.S. patent application Ser. No. 07/668,929, filed Mar. 13, 1991.

BACKGROUND OF THE INVENTION

1. Field of the Invention

This invention relates to the treatment of aqueous media, and more particularly concerns a process for the removal of selected anions dissolved in water.

2. Description of the Prior Art

Several general varieties of exchange resins are well known for the removal of ionic species from water solutions. One type of ion exchange resin, generally referred to as a strong acid type of cation exchanger, is comprised of bead-like particles of cross-linked polystyrene which have been sulphonated so as to contain aromatic sulphonic acid groups. Although such strong acid exchangers have a high capacity for positively charged metal ions, little selectivity is shown in the treatment of multicomponent solutions. Weak acid ion exchange resins, which contain carboxyl groups instead of sulphonic acid groups, likewise demonstrate little specificity in the treatment of multicomponent mixtures.

Specialized polymer products, generally referred to as chelating resins, can selectively absorb ions from solution. However, most such resins have affirmity for only positively charged ions. Similarly, inorganic zeolites, peat moss, and algea cells demonstrate selective absorption characteristics, but are usually effective only with cations.

Exchange resins having affinity for anions are generally comprised of bead-like particles of cross-linked polystyrene containing quaternary ammonium groups. As in the case of cation exchange resins, little selectivity is demonstrated.

U.S. Pat. No. 3,715,339 discloses a gel polymer product for water treatment comprised of a chain of recurring aliphatic amine groups, and pendant carboxyl groups. Although having the ability to absorb certain ions from aqueous solutions, the polymer product, without special modifications and critically chosen conditions of use, performs poorly in selectively absorbing anions.

It is accordingly an object of the present invention to provide a process for the selective removal of anions from aqueous solutions.

It is another object of this invention to provide a process as in the foregoing object which can be rapidly accomplished and which does not affect anions other than those which are selectively removed.

These objects and other objects and advantages of the invention will be apparent from the following description.

SUMMARY OF THE INVENTION

The above and other beneficial objects and advantages are accomplished in accordance with the present invention by a process for selectively removing anions from an aqueous solution comprising contacting said solution for an affective period of time with a fluid-permeable form of a water insoluble polymer having recurring nitrogen atoms capable of functioning as complex-forming ligands that bond to multivalent cations, and containing chemically bound activating cations of a multivalent metal, said polymer being of a gel form capable of absorbing between 90% and 300% of water based upon the dry weight of the polymer. The polymer is preferably employed as a bed, through which the aqueous solution is caused to flow. In such manner of use, an effective period of contact time is achieved when the rate of flow of the solution through the bed is between 0.05 and 2.0 bed volumes per minute.

Preferred polymers are of synthetic origin, and contain aliphatic nitrogen atoms spaced apart by two carbons. Other useful polymers include those of natural origin, such as peat moss and cell walls of algea cells.

Preferred multivalent cations include $Mg^{++}$, $Ca^{++}$, $Al^{+++}$, $Cu^{++}$ and $Fe^{+++}$. The fluid-permeable form of the polymer may be a bed of granules having a mesh size in the range of about 20 to 100 mesh. In a particularly preferred embodiment, the fluid-permeable form of the polymer is comprised of an open-celled cellulosic sponge product containing said polymer in an amount constituting between 30% and 70% of the overall dry weight of said product. The sponge product is preferably of cuboid configuration having an average volumetric size less than a cubic inch.

DESCRIPTION OF THE PREFERRED EMBODIMENT

The polymer product employed in the process of the present invention is preferably one produced by the insolubilization of polyethyleneimine (PEI) with a multi-functional carboxylic acid. Polyethyleneimine, a water-soluble branched chain polymer having recurring secondary amino nitrogen atoms, is commercially available in molecular weights ranging from 1200 to 60,000. Preferred polycarboxylic acids are those which additionally contain amino nitrogens, typical embodiments including iminodiacetic acid, ethylenediamine tetraacetic acid and nitrilotriacetic acid. The resultant insolubilized or crosslinked PEI preferably contains pendant carboxyl groups by virtue of the multi-functional carboxylic acid.

The polymer product is produced by initially dissolving the otherwise insoluble multi-functional carboxylic acid in an aqueous solution of PEI to produce a homogeneous pre-polymer mixture. The water of solution is then removed, preferably by heating, thereby producing a stiff paste. The paste is subjected to thermal curing at temperatures in the range of 130 degrees C. to 170 degrees C. and preferably in an oxygen-free environment to achieve an amide-type condensation cross-linking reaction which produces a water-insoluble gel polymer product that swells in water. The extent of cross-linking of the gel polymer is controlled primarily by the ratio of PEI/polycarboxylic acid and the time and temperature of the curing cycle. The gel polymer product absorbs water in amounts generally indicative of the extent of cross-linking. For example, highly cross linked polymers absorb less than 90% of water based upon their dry weight. Very slightly cross-linked polymers can absorb as much as 500% of water. It has been found that, for the purposes of the present invention, polymers having a water absorption capacity less than 90% lack adequate ion exchange capacity, and polymers having a water absorption capacity over 300% lack adequate cohesive strength.

The amount of water absorbable by the gel polymer is measured by blotting excess water off a mass of fully water-swollen polymer, weighing, heating to dryness, and re-weighting. The percent water absorption is expressed as the weight of water divided by the dry weight of the polymer times one hundred. In those instances, where the polymer is incorporated into a sponge, the percent water absorption is measured on a polymer of identical composition cured in identical manner in the absence of the sponge.

When the polycarboxylic acid is nitrilotriacetic acid (NTA), the preferred weight ratio of NTA/PEI to achieve crosslinking in the desired range is between 0.9 and 1.4.

Incorporation of the activating metal cation into the polymer may be accomplished either by inclusion of the cation within the prepolymer mixture, or by an after-treatment of the polymer. The metal cations become chemically bound to the polymer by formation of ionic bonds with carboxyl groups and formation of coordination bonds with amine groups. Regardless of the exact manner of chemical bonding, the polymer interacts with a stoichiometric amount of the metal ion. By this it is meant that each polymer type can reproducibly saturate with a specific quantity of metal ions. Any metal ions present beyond the stoichiometric amount are not chemically bound, and can be removed by physical methods such as extraction with water. It is to be understood however, that the manner of chemical bonding may be governed by general considerations of chemical equilibrium. Accordingly, excessive extraction of a metal-containing polymer with water may in some instances cause a slight loss of metal ions, the magnitude of the loss being dependent upon an equilibrium constant.

Polymers prepared for use in accordance with the present invention, containing stoichiometric quantities of metal cations, generally contain a weight of metal ion in the range of 2% to 20%, based upon the dry weight of polymer. The exact weight of metal content is dependent upon the particular nature of the polymer and the valence and atomic weight of the metal ion.

In one embodiment of the process of the present invention, a stationary bed of the aforesaid polymer in fluid-permeable form is confined within a vertical cylindrical column, and the solution to be treated is passed downwardly through said bed. In such manner of operation, absorption bands are generally produced wherein the uppermost band contains the most strongly absorbed anion. As the bed saturates with the most strongly absorbed anion, the uppermost band, which may be visibly discernible, descends the column. In such beds confined within cylindrical columns, the ratio of the height of the bed to its diameter is preferably in the range of 6 to 12. Depending upon the nature of the absorbed anion, the anion-saturated polymer may be treated with an elutriating solution which removes the anion and prepares the polymer for re-use.

The selectivity of the polymer generally parallels solubility product (Ksp) considerations. For example, the activating cation will tend to absorb that anion which would ordinarily form with the cation the least soluble compound. When saturated with anions, the polymer will preferably contain at least 10% (dry weight basis) of anionic material.

The following examples are presented for illustrative purposes without intending to be limitative of the scope of the invention. All parts and percentages are by weight.

EXAMPLE 1

A polymer suitable for use in the process of the present invention is produced by initially preparing a prepolymer solution consisting of 11 parts NTA, 10 parts PEI having a molecular weight of 1800 and 39 parts water. The solution is poured into a stainless steel tray which is placed in an oven maintained at 160 degrees C. Water of solution is initially evaporated, producing a highly viscous paste. With continued heating, the paste cures to a polymer in the form of a rigid bubbled mass. Water is added to the bubbled mass, and the polymer self-granulates by decrepitation to form water-swollen granules. The granules are wet sieved to obtain fractions of reasonably uniform particle size. The water absorption of the granules is 133%.

In separate batches, the aforesaid granules were placed in a vertical absorption column and therein treated to saturation with 5% aqueous solutions of $FeCl_3$ and $CuCl_2$. The $FeCl_3$-treated granules become brown in color as a result of chemical bonding with $Fe^{+++}$, and the $CuCl_2$-treated granules become green as a result of chemical bonding with $Cu^{++}$. The $Fe^{+++}$ treated granules contain 4.7% iron, dry weight basis. The $Cu^{++}$ treated granules contain 6.1% copper, dry weight basis.

EXAMPLE 2

A sample of powdered ore containing micron-sized elemental gold was subjected to a standard cyanide leach treatment employing a 0.05% aqueous solution of NaCN maintained at pH 11.0 with $Ca(OH)_2$. The resultant leachate solution, containing the anions: $OH^-$, $CN^-$ and $Au(CN)_2^-$, was then fed downwardly through a bed of granular absorbent confined within a vertical cylindrical column. In separate experiments, different granular materials, as listed in Table 1, were contained within the column. In the several experiments, the flow rate was 0.06 bed volume/minute. The gold contents of the feed and effluent solutions were monitored by atomic absorption analysis. Flow was continued until feed and effluent solutions were found to have identical gold content, at which point the granules were considered saturated. The saturated granules were washed with 5 bed volumes of water, then removed from the column, dried, and analyzed for gold content. The saturation level gold contents of the materials studied are shown in Table 1.

TABLE 1

| Granular Material | Activating Cation | Gold Content (1) |
|---|---|---|
| A. From Example 1 (4) | None | 2.3% |
| B. From Example 1 (4) | $Fe^{+++}$ | 17.5% |
| C. From Example 1 (4) | $Cu^{++}$ | 25.2% |
| D. Amberlite DB-1 (2) | $Fe^{+++}$ | 1.6% |
| E. Amberlite IR-120 (3) | $Fe^{+++}$ | 0.8% |

(1) At saturation. Percent by weight, dry weight basis.
(2) A methacrylic acid-divinylbenzene weak acid ion exchange resin sold by the Rohm & Haas Co. of Pennsylvania, and saturated with $Fe^{+++}$.
(3) A sulphonated polystyrene strong acid ion exchange resin sold by the Rohm & Haas Co. of Pennsylvania, and saturated with $Fe^{+++}$.
(4) 40/80 mesh.

As the data of Table 1 indicate, significant amounts of gold are absorbed only in experiments B and C, which employ the cation-activated polymer of the present invention. The noncation-treated polymer of experiment A is substantially ineffective, as are the cation-treated ion exchange resins of experiments D and E. The data illustrates the criticality of polymer type and cation activation in producing selective affinity for the $Au(CN)_2^-$ anion of the gold ore leachate solution.

Gold-saturated granules of experiment C were treated in a column with a 3% HCl elutriating solution. The absorbed gold was thereby removed without removal of the $Cu^{++}$ activating cation. Following a water wash, the granules were found to be capable of another absorption cycle.

EXAMPLE 3

The $Fe^{+++}$-treated polymer of Example 1, in 20/40 mesh size, was loaded into a 4" I.D. polyacylic column to form a bed having a height of 39". The column thus prepared was utilized to treat polluted water of a creek that flows into the Chesapeake Bay, Virginia side, said water containing 1.8 ppm of $PO_4^{-3}$ plus variable amounts of $Cl^-$, $NO_3^-$ and $SO_4^{-2}$. Said water was filtered to remove suspended material prior to being fed into the column. In a series of experiments, as indicated in Table 2, the flow rate was varied, and the corresponding concentration of $PO_4^{-3}$ was determined. As the brown-colored $Fe^{+++}$ activated granules saturate with $PO_4^{-3}$, they become yellow in color. The washed, saturated granules were found to contain 19.3% $PO_4^{-3}$ (dry weight basis).

TABLE 2

| Flow Rate (bed volume/minute) | Effluent $PO_4^{-3}$ (ppm) |
|---|---|
| 0.08 | 0.0 |
| 0.12 | 0.1 |
| 0.53 | 0.4 |
| 1.34 | 0.7 |
| 1.91 | 0.9 |
| 2.17 | 1.5 |

As the data of Table 2 indicate, at flow rates of about 0.05 to about 2.0 bed volumes/minute, the granules are highly effective in removing $PO_4^{-3}$ from the feed solution.

In a control experiment, the non-$Fe^{+++}$-treated granules of Example 1 were employed in the same column experiment. No $PO_4^{-3}$ was found to be absorbed, as determined by analysis of both the effluent stream and the granules.

EXAMPLE 4

A prepolymer solution similar to that described in Example 1 but comprised of 13 parts NTA, 10 parts PEI and 48 parts water was employed to impregnate 12 mm cubes of open-celled cellulosic sponge. The impregnated sponge was dried and cured at 155 degrees C. Following washing with water and drying, the resultant composite product was found to contain 61% by weight of a polymer capable of absorbing 123% water. The cubes were then placed in a rotating drum containing water and to which $Ca(OH)_2$ was continuously added until the equilibrium pH reached 7.0.

The sponge cubes thereby activated with $Ca^{++}$ were placed in a 12" I.D. vertical absorption column to form a bed of 7 foot height. An industrial effluent solution containing 73 ppm $Cl^-$ and 3.5 ppm $CrO_4^{-2}$ was fed upwardly through the bed at a flow rate of 0.1 bed volume/minute. As the cubes absorb $CrO_4^{-2}$ they become dark brown in color. Upon saturation, the sponges were found to contain 15.2% $CrO_4^{-2}$ (dry weight basis).

In a control experiment, the sponge cubes prepared as above but without activation with $Ca^{++}$ were treated in the same manner with the same solution. At saturation, the cubes were found to contain only 3.7% $CrO_4^{-2}$.

EXAMPLE 5

Calcium-activated sponge cubes of Example 4 were placed in a 6" I.D. vertical polyacrylate column to form a bed of 5 foot height. A spent photographic solution containing 785 ppm $Ag(S_2O_3)_2^{-3}$, 1092 ppm of $(S_2O_3)^{-2}$ and 683 ppm $SO_3^{-2}$ was passed downwardly through the bed at a flow rate of 0.09 bed volume/minute.

As the bed absorbs $Ag(S_2O_3)_2^{-3}$, a visibly descernible brown band forms and descends the bed. The effluent was found to contain 2.7 ppm $Ag(S_2O_3)_2^{-3}$, 185 ppm $SO_3^{-2}$ and 986 ppm $(S_2O_3)^{-2}$. The bed was then washed with 5 bed volumes of water, and a sample of the saturated sponge was removed from the top of the bed. The sample was found to contain 16.3% silver (dry weight basis).

By way of comparison, the same experiment was conducted employing the non-calcium-activated sponge of Example 4. The resultant saturated sponge at the top of the bed was found to contain only 1.8% silver.

EXAMPLE 6

A prepolymer solution was prepared by forming a homogeneous solution comprised of 12.5 parts NTA, 10 parts PEI of 10,000 molecular weight, and 50 parts water. A 50/50 mixture of freshly precipitated $Mg(OH)_2$ and $Al(OH)_3$ was slowly added to the homogeneous solution with stirring until an equilibrium pH of 7.0 was achieved. The resultant solution was employed to impregnate 12 mm cubes of an open-celled cellulosic sponge. The impregnated sponge was dried and cured at 160 degrees C. Following washing with water and re-drying, the resultant composite sponge product was found to contain 49% of a polymer capable of absorbing 142% water. By virtue of the aforesaid manner of production, the polymer is activated with $Mg^{++}$ and $Al^{+++}$.

The aforesaid sponge cubes containing cation-activated polymer were placed in a 12" I.D. vertical absorption column to form a bed of 6 foot height. Acid mine drainage water from the Minturn Mine, Colorado, containing 584 ppm $SiO_4^{-4}$, 187 ppm $Cl^-$, 93 ppm $NO_3^-$, and numerous other ionic species, was fed downwardly through the bed at a flow rate of 0.2 bed volume/minute. After 20 bed volumes of feed water passed through the bed, a sample of effluent water was taken for analysis. The concentration of $SiO_4^{-4}$ was found to be only 18 ppm. Removal of silicate anion, as achieved in this example, is beneficial in protecting reverse osmosis units which, during water purification, are deleteriously affected by silicate anion.

In a control experiment, the same polymer was produced with the exception that the polymer was not activated with multivalent cations. When the effluent was sampled in the same manner, the $SiO_4^{-4}$ content was found to be 491 ppm.

EXAMPLE 7

A prepolymer solution was prepared by forming a homogeneous solution comprised of 9.5 parts NTA, 3.5 parts ethylenediamine tetraacetic acid, 10 parts of PEI of 10,000 molecular weight, and 48 parts water. The solution was employed to impregnate 15 mm cubes of an open-celled cellulosic sponge. The impregnated sponge was dried and cured at 160 degrees C. in a nitrogen atmosphere. Following washing with water and re-drying, the resultant composite sponge product was found to contain 52% of a gel polymer capable of absorbing 168% water.

The aforesaid polymer-containing sponge cubes were loaded into a 4" I.D. vertical polyacrylate column to form a bed of 30" height. A 3% $CuCl_2$ solution was fed downwardly through the bed at a rate of 0.08 bed volume/minute. As the $Cu^{++}$ absorbs, the sponge cubes become green in color, forming a band which descends the column. When the entire bed of sponges is green, representing activation of the polymer with $Cu^{++}$, treatment with $CuCl_2$ solution was discontinued and the bed was washed with 6 bed volumes of water. The resultant sponge was found to contain 5.1% copper.

The bed thus prepared was employed to treat an industrial waste stream containing 55 ppm $Cl^-$, 27 ppm $SO_4^{-2}$ and 12 ppm $S^{-2}$. The stream was fed downwardly through the bed at a rate of 0.1 bed volume/minute. A black band formed at the top of the bed and gradually descended the column. When the band had descended about ⅔ of the bed, a sample was taken of the bed effluent. Analysis of the sample revealed 0 ppm $S^{-2}$, and 76 ppm $Cl^-$.

It is particularly noteworthy that, if the polymer were not selective in its affinity for the sulfide ion $S^{-2}$, its ionic absorption capacity would have saturated with the more abundant chlorine and sulfate anions. The increased $Cl^-$ content is attributable to the exchange of $S^{-2}$ ions for the $Cl^-$ ions that accompany the $Cu^{++}$ as a result of activation with $CuCl_2$.

By way of comparison, the same experiment was run but with omission of activation of the polymer with $Cu^{++}$. It was found in the treatment of the same waste stream under the same conditions that no sulfide anion was removed.

In certain applications, absorbed ions such as sulfide, chromate and silicate cannot be eluted from the metal-activated polymer. In such situations, the anion-saturated polymer must be disposed of. Because the preferred synthetic polymer of this invention absorbs large quantities of anions, its use on a one time basis is economically justifiable. The use of certain naturally occurring polymers such as peat moss and alga cells in the process of the present invention may not be economically feasible in single use applications because of their low anion content at saturation.

EXAMPLE 8

The process of Example 2 was repeated employing, in two separate trials, the following granular materials.
A) Alga SORB TM, a product of Bio-Recovery Systems, Inc., comprised of dead algae cells in a silica gel polymer. The dead alga is comprised of biopolmers containing carboxyl, imidazole, sulfhydryl, amino, thioiether, phenol, carbonyl, amide and hydroxyl groups. Said groups function as ligands which form coordination bonds with certain multivalent cations. The Alga SORB TM was activated with 3% $CuCl_2$ solution to saturation, then washed with water. The amount of copper thereby absorbed by the Alga SORB TM was 3.2% (dry weight basis).
B) BioBeads TM, a product of the Rahco Company and manufactured under license from the U.S. Bureau of Mines. This product is comprised of peat moss immobilized within an organic polymer that is formed into bead-like particles in a prilling operation. The peat moss contains biopolymers having many of the ligand groups found in the aforesaid Alga SORB TM. The Bio Beads TM were activated with $CuCl_2$ solution to saturation and washed with water. The amount of copper thereby absorbed by the BioBeads TM was 2.8% (d.w.b.)

Both granular materials were employed in the same manner as in Example 2 to treat the same gold/cyanide leachate solution. It was found that granules A absorbed 3.3% gold (d.w.b.), and granules B absorbed 4.1% gold (d.w.b.). By way of comparison, the non-copper activated granules A and B absorbed 1.2% and 2.3% gold, respectively (d.w.b.).

It is therefore seen that biopolymers containing ligand groups perform in accordance with the process of this invention. However, the biopolymers are considerably less effective than the preferred synthetic polymer containing recurring aliphatic amine groups separated by two carbons.

EXAMPLE 9

Polymer granules were prepared by the method of Example 1 with the exception that the weight ratio of NTA/PEI was varied in several experiments. All granules produced were treated to saturation with $FeCl_3$, and were sieved to 40/80 mesh size. The granules were loaded into a vertical glass tube of 0.5 inch inside diameter to form a bed of 5 inch height. A solution containing 883 ppm $Na_3PO_4$ was run through the tube at a flow rate of 1.6 cc/min. (which is essentially 0.1 bed volume/minute). When the granules became saturated with absorbed phosphate, they were removed from the tube and analyzed for phosphate content. The results obtained are reported in Table 3.

TABLE 3

| NTA/PEI* | % $PO_4^{-3}$ content** |
|---|---|
| 0.6 | 5.4 |
| 0.8 | 6.2 |
| 0.9 | 11.3 |
| 1.1 | 17.6 |
| 1.3 | 19.4 |

*weight ratio
*dry weight basis

The data of Table 3 indicate a sharp increase in phosphate uptake at NTA/PEI ratios above 0.8. It is to be noted that, at ratios below 1.0, the polymer has few, if any pendant carboxyl groups because the carboxyl groups have been utilized in forming cross-linking amide bonds with the amine groups of PEI. At ratios above 1.0, there is an excess of carboxyl groups which manifest themselves as pendant carboxyl groups attached to NTA molecules wherein one or two of the carboxyl groups of the NTA molecule are attached by amide bonds to PEI. It is accordingly seen that the preferred polymer for use in the process of the present invention has carboxyl groups pendantly supported by an aliphatic polyamine backbone.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A process for the selective removal of anions from aqueous solution comprising contacting said solution with a porous format of an insoluble gel form of an aliphatic polymer having recurring nitrogen atoms spaced apart by two carbon atoms, said polymer containing chemically bonded thereto a substantially saturation amount of a multivalent metal cation representing between 2% and 20% of the dry weight of said polymer, said gel form containing between 90% and 300% of water based upon the dry weight of polymer.

2. The process of claim 1 wherein said polymer is deposited within an open-celled cellulosic sponge to produce a porous composite sponge product containing between 30% and 70% by weight of said polymer.

3. The process of claim 1 wherein said multivalent metal cation is a member selected from the group consisting of $Ca^{+2}$, $Mg^{+2}$, $Al^{+3}$, $Cu^{+2}$ and $Fe^{+3}$.

4. The process of claim 1 wherein said polymer is disposed as a bed through which said solution is passed.

5. The process of claim 4 wherein the rate of passage of said solution through said bed is between 0.05 and 2.0 bed volumes/minute.

6. The process of claim 1 wherein said polymer further contains pendant carboxyl groups.

7. The process of claim 1 wherein said polymer is derived from the thermal interaction of polyethyleneimine (PEI) with a polycarboxylic acid.

8. The process of claim 7 wherein said polycarboxylic acid contains at least one amino nitrogen atom.

9. The process of claim 8 wherein said polycarboxylic acid is nitrilotriacetic acid (NTA).

10. The process of claim 9 wherein the weight ratio of NTA/PEI employed to produce said polymer is between 0.9 and 1.4.

* * * * *